United States Patent
Krappe

(10) Patent No.: US 10,073,824 B1
(45) Date of Patent: Sep. 11, 2018

(54) METHOD FOR BUILDING A SPREADSHEET TEMPLATE WITH DYNAMIC DATA TRANSFER CAPABILITIES TO A REMOTE APPLICATION

(71) Applicant: Apttus Inc, San Mateo, CA (US)

(72) Inventor: Kirk Krappe, Portola Valley, CA (US)

(73) Assignee: APTTEX CORPORATION, San Mateo, CA (US)

( * ) Notice: Subject to any disclaimer, the term of this patent is extended or adjusted under 35 U.S.C. 154(b) by 621 days.

(21) Appl. No.: 14/073,356

(22) Filed: Nov. 6, 2013

(51) Int. Cl.
*G06F 17/24* (2006.01)

(52) U.S. Cl.
CPC .................... *G06F 17/246* (2013.01)

(58) Field of Classification Search
CPC ........................................... G06F 17/246
USPC ........................................................ 715/220
See application file for complete search history.

(56) References Cited

U.S. PATENT DOCUMENTS

| 7,415,664 | B2* | 8/2008 | Aureglia | G06F 17/246 |
| | | | | 715/212 |
| 2004/0088650 | A1* | 5/2004 | Killen | G06F 17/246 |
| | | | | 715/213 |
| 2004/0205524 | A1* | 10/2004 | Richter | G06F 17/246 |
| | | | | 715/213 |
| 2006/0095833 | A1* | 5/2006 | Orchard | G06F 17/246 |
| | | | | 715/209 |
| 2006/0112329 | A1* | 5/2006 | Collie | G06F 17/2229 |
| | | | | 715/209 |
| 2006/0167911 | A1* | 7/2006 | Le Cam | G06F 17/246 |
| 2007/0016849 | A1* | 1/2007 | Aureglia | G06F 17/246 |
| | | | | 715/220 |
| 2007/0136352 | A1* | 6/2007 | Chape | G06Q 10/10 |
| 2007/0185935 | A1* | 8/2007 | Olivieri | G06F 17/246 |
| 2007/0219956 | A1* | 9/2007 | Milton | G06F 17/246 |
| 2008/0306981 | A1* | 12/2008 | Jiang | G06F 17/248 |
| 2009/0044095 | A1* | 2/2009 | Berger | G06F 17/30569 |
| | | | | 715/226 |
| 2009/0234818 | A1* | 9/2009 | Lobo | G06F 17/30719 |
| 2009/0327321 | A1* | 12/2009 | McCormack | G06F 17/30569 |
| 2010/0169758 | A1* | 7/2010 | Thomsen | G06F 17/246 |
| | | | | 715/212 |
| 2011/0173529 | A1* | 7/2011 | Wagner | G06Q 10/06 |
| | | | | 715/235 |
| 2012/0016899 | A1* | 1/2012 | Kumar | G06F 17/30566 |
| | | | | 707/769 |
| 2012/0201457 | A1* | 8/2012 | Bart | G06K 9/00442 |
| | | | | 382/176 |
| 2013/0124960 | A1* | 5/2013 | Velingkar | G06F 17/30286 |
| | | | | 715/220 |

(Continued)

OTHER PUBLICATIONS

Abraham, Robin, and Martin Erwig. "Inferring templates from spreadsheets." In Proceedings of the 28th international conference on Software engineering, pp. 182-191. ACM, 2006.*

(Continued)

*Primary Examiner* — Frank D Mills
(74) *Attorney, Agent, or Firm* — HM Law Group LLP; Van Moodley, Esq.

(57) ABSTRACT

A method for creating a spreadsheet template to facilitate creation of a spreadsheet is disclosed. The method comprises marking a cell in the range of cells as being a potential record cell; and creating a save map to define attributes to be assembled into a record for an actual record cell.

19 Claims, 14 Drawing Sheets

(56) References Cited

U.S. PATENT DOCUMENTS

| | | | |
|---|---|---|---|
| 2013/0218913 A1* | 8/2013 | Bart | G06F 17/30339 707/755 |
| 2014/0074878 A1* | 3/2014 | Bornea | G06F 17/2745 707/769 |
| 2014/0244416 A1* | 8/2014 | Venkat | G06Q 30/0603 705/26.1 |
| 2015/0095312 A1* | 4/2015 | Gulwani | G06F 17/246 707/722 |
| 2015/0286552 A1* | 10/2015 | Michelsen | G06F 11/3684 714/38.1 |

OTHER PUBLICATIONS

Abraham, Robin, Martin Erwig, Steve Kollmansberger, and Ethan Seifert. "Visual specifications of correct spreadsheets." In Visual Languages and Human-Centric Computing, 2005 IEEE Symposium on, pp. 1-8. IEEE, 2005.*

* cited by examiner

Repeating Data Range

| Data Area | Cell or Range | Repeat | Field | Query/Method/Service | Based on Field | Blank Lines |
|---|---|---|---|---|---|---|
| Line Items | H11 to O11 | Below | | | Line # | 0 |

FIG. 5A

Save Map

| Cell | Orientation | Cell/Range | Table | Field |
|---|---|---|---|---|
| H11 | row | Line # | Quote Lines | Line_Number |
| H11 | independent | OpportunityId | Quote Lines | Opportunity_id |
| H11 | row | ProductCode | Quote Lines | Product_id |
| H11 | row | Qty | Quote Lines | Qty |
| H11 | row | Price | Quote Lines | Price |

FIG. 5B

|   | A | B | C | D | E | F | G | ... | N | O | P |
|---|---|---|---|---|---|---|---|---|---|---|---|
| 1 | Fiscal Period | FY13 | | | | | | | | | |
| 2 | Organization Unit | Marketing/UK | | | | | | | | | |
| 3 | | | | | | | | | | | |
| 4 | | | Fiscal Periods | FY13 Jan | FY13 Feb | FY13 Mar | FY13 Apr | ... | FY13 Nov | FY13 Dec | FY13 Total |
| 5 | | | Account | | | | | | | | |
| 6 | | | Entertainment | 10000 | | | 22000 | | | | |
| 7 | | | Campaigns | 8000 | | | | | | | |
| 8 | | | Events | | | 4000 | | | | | |
| 9 | | | Salaries | 9000 | 9000 | 9000 | 9000 | | | | |
| 10 | | | Advertising | | | | | | | | |
| 11 | | | Total | 27000 | 9000 | 11000 | 31000 | | | | |

*FIG. 8*

| Budget Header Table (Pre-data save) 900 | | |
|---|---|---|
| Budget Period | Modified By | Org ID | Date |

*FIG. 9A*

| Budget Line Item Table (Pre-Data Save) 902 | | |
|---|---|---|
| Org_Id | Item_Id | Period_Id | Budget_Amount |

*FIG. 9B*

| Budget Line Item Table (Post-data save) 904 | | |
|---|---|---|
| Budget Period | Modified By | Org ID | Date |
| FY1301 | Jules | Marketing/UK | 6-1-13 |

*FIG. 9C*

Budget Line Item (Post-Data Save)

| Org_Id | Item_Id | Period_Id | Budget_Amount |
|---|---|---|---|
| Marketing/UK | Entertainment | FY1301 | 10000 |
| Marketing/UK | Campaigns | FY1301 | 8000 |
| Marketing/UK | Campaigns | FY1304 | 22000 |
| Marketing/UK | Events | FY1303 | 4000 |
| Marketing/UK | Salaries | FY1301 | 9000 |
| Marketing/UK | Salaries | FY1302 | 9000 |
| Marketing/UK | Salaries | FY1303 | 9000 |
| Marketing/UK | Salaries | FY1304 | 9000 |

Repeating Data Range

| Data Area | Cell/Range | Repeat | Field | Query/Method/Service | Based on Field | Blank Lines |
|---|---|---|---|---|---|---|
| Budget Items | B6:O6 | Below | | | Line # | 0 |

FIG. 10A

Range Names

| Name | Cell |
|---|---|
| ItemId | B6 |
| PeriodId | D3 |
| BudgetAmt | D6 |

FIG. 10B

Save Map 1004

| Cell | Orientation | Value | Cell/Range | Table | Field |
|---|---|---|---|---|---|
| D6 | independent | | Fiscal Period | Budget Header | Budget_Period |
| D6 | budgetheader | | Orgid | Budget Header | Org_id |
| D6 | budgetheader | User_id | | Budget Header | Modified_By |
| D6 | budgetheader | Date | | Budget Header | Date |
| D6 | budgetdetail | | Orgid | Budget Line Item | Org_id |
| D6 | budgetdetail | | Itemid | Budget Line Item | Item_id |
| D6 | budgetdetail | | PeriodID | Budget Line Item | Period_id |
| D6 | budgetdetail | | BudgetAmt | Budget Line Item | Budget_Amount |

METHOD FOR BUILDING A SPREADSHEET TEMPLATE WITH DYNAMIC DATA TRANSFER CAPABILITIES TO A REMOTE APPLICATION

FIELD

Embodiments of the present invention relate to spreadsheets. In particular, embodiments of the present invention relate to templates for spreadsheets.

BACKGROUND

Spreadsheets may be used for organization and analysis of data in tabular form. Within a spreadsheet, data is represented as cells of an array, organized in rows and columns. For example in the case of a budget, each column may be used to represent a fiscal period, whereas each row may be used to represent an account.

Within an organization/enterprise spreadsheet templates, e.g. with predefined cell ranges and formulas, may be used to save time.

SUMMARY

A method for generating a spreadsheet template is disclosed. The method comprises marking at least one cell as being a potential record cell; selectively converting the at least one cell into an actual record cell; and creating a save map to define attributes to be assembled into a record for an actual record cell.

Other aspects of the invention will be apparent from the detailed description below.

BRIEF DESCRIPTION OF THE FIGURES

FIG. 5A shows a repeating data range associated with the spreadsheet of FIG. 4, in accordance with one embodiment of the invention.

FIG. 5B shows a save map associated with the spreadsheet of FIG. 4, in accordance with one embodiment of the invention FIG. 6 a block diagram of components of a spreadsheet template, in accordance with one embodiment of the invention.

FIG. 8 shows a spreadsheet for creating a budget, in accordance with one embodiment of the invention.

FIGS. 9A-9D show examples of remote application tables corresponding to a budgeting application, in accordance with one embodiment of the invention.

FIG. 10A shows a repeating data range associated with the spreadsheet of FIG. 8, in accordance with one embodiment of the invention.

FIG. 10B shows a range name table associated with the spreadsheet of FIG. 8, in accordance with one embodiment of the invention.

FIG. 10C shows a save map associated with the spreadsheet of FIG. 8, in accordance with one embodiment of the invention

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
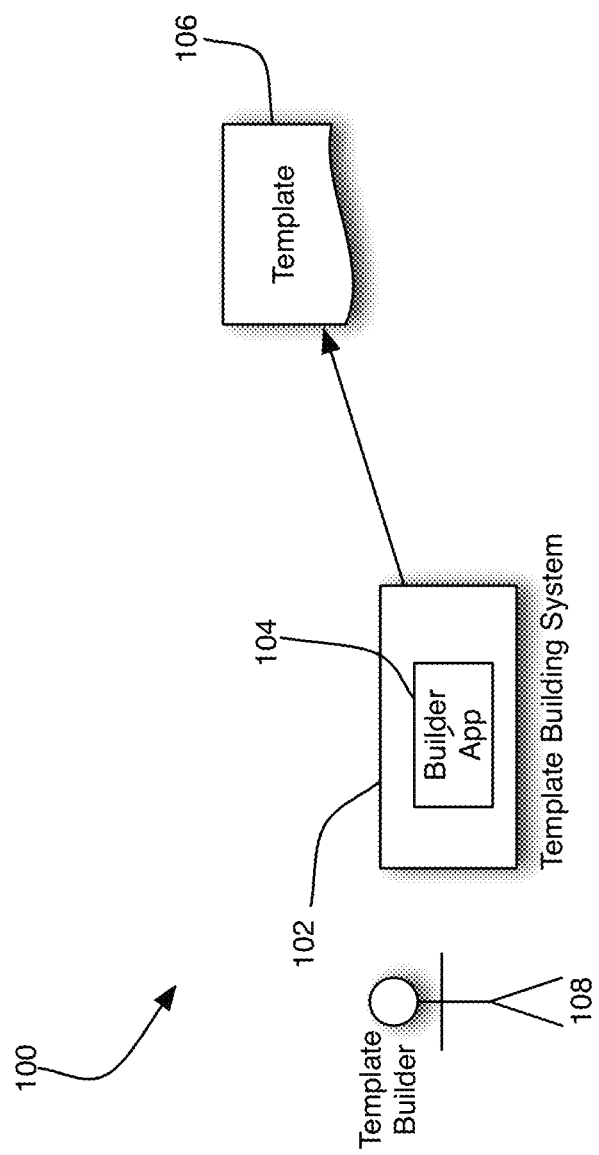
FIG. 1 shows a deployment scenario 100 in accordance with one embodiment of the invention.

FIG. 1 shows a deployment scenario 100 in accordance with one embodiment of the invention. The scenario 100 shows a template building system 102, which includes a builder application 104 that may be used to build a spreadsheet template 106 based on inputs by a human template builder 108.

Figure 2:
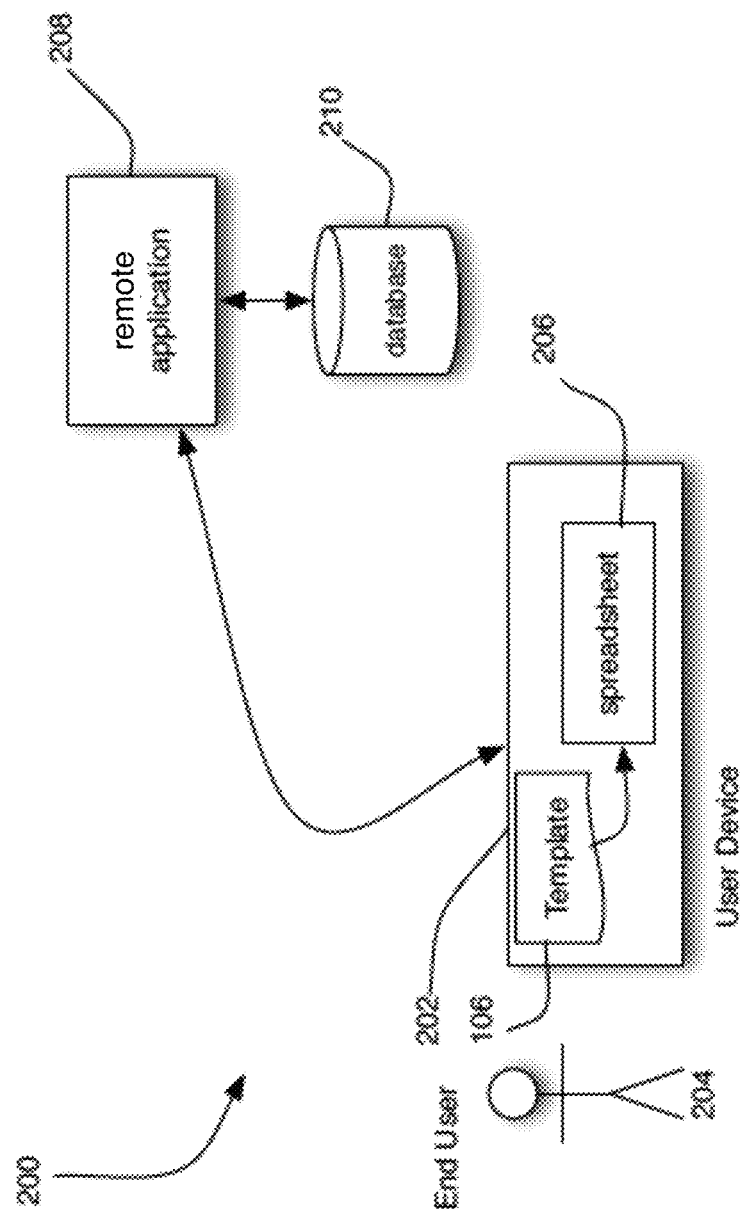
FIG. 2 shows a deployment scenario 200 in accordance with one embodiment of the invention.

FIG. 2 shows a deployment scenario 200 in accordance with another embodiment of the invention. The scenario 200 shows a user device 202, which is under control of an end user 204. In one embodiment, the user device 202 may be any computing device that is capable of running a spreadsheet program. Examples of user devices include desktop computers, laptop computers, mobile phones, tablet computers, etc. In one embodiment the end user 204 uses template 104 executing on the device 202 to instantiate or create a spreadsheet 206. The spreadsheet 206 may be configured to connect with a remote or enterprise application 208, to facilitate an exchange of data with a database 210 associated with the remote application 208, as will be explained.

Figure 3:
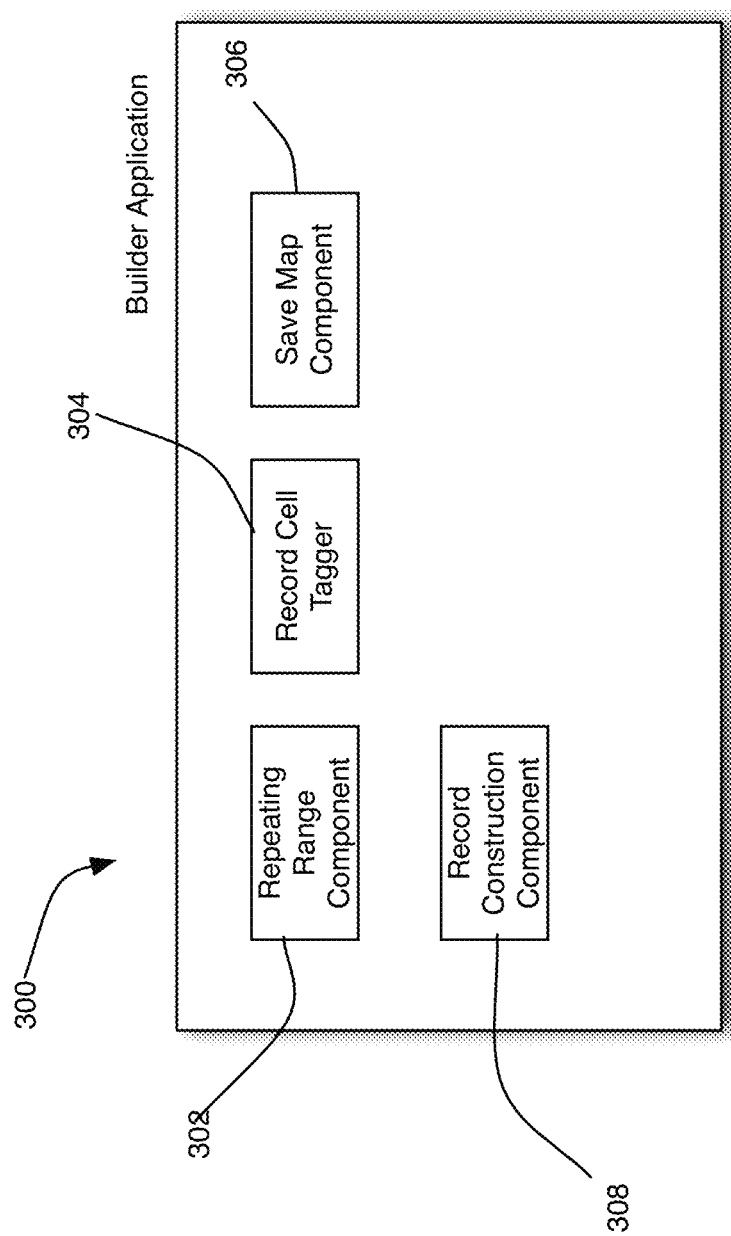
FIG. 3 a block diagram of components of a template builder application, in accordance with one embodiment of the invention.

FIG. 3 shows the functional blocks of the builder application 104, in one embodiment. Referring to FIG. 3, it will be seen that the builder application 104 includes a repeating range component 302, a record cell tagging component 304, a save map component 306, and a record construction component 308. In one embodiment, the repeating range component 302 provides a capability to define a range of spreadsheet cells that repeat in structure but whose cell values vary. For example, consider the spreadsheet 800 shown in FIG. 8 In this spreadsheet, cells D6 to O6 form a repeating data range. Thus, the repeating range component 302 allows the template builder 108 to define which cells are going to form a repeating data range.

The record cell-tagging component 304 allows the template builder 108 to tag or identify a spreadsheet cell as being a "potential" record cell. A potential record cell is one that has the potential to become an "actual" record cell. In one embodiment, a potential record cell may be selectively converted in to an actual record cell based on a condition associated with the actual record cell. The condition is to control when the potential record cell is to become an actual record cell. In some cases, a potential record cell may be converted into an actual record cell by default if there is no condition associated with the potential record cell. In one embodiment, the record cell tagging component 304 allows the template builder 108 to specify the conditions under which a cell marked as a potential record cell becomes an actual record cell, as will explained later.

In one embodiment, a behavior of a potential record cell may be extended in a relative manner to other cells using the repeating range component 302.

The save map component 306 provides the template builder 108 a capability to define record attributes for any cell determined to be an actual record cell during execution of a spreadsheet based on the spreadsheet template 106. In one embodiment, the record attributes may be based on other cells in the current spreadsheet, other spreadsheets, or other data sources. The record attributes for each record cell are saved in a save map, in one embodiment. FIG. 10C shows an exemplary save map 1004.

The record construction component 308 provides logic to construct records for the remote application 208. In one embodiment, said logic executes at runtime after the end user 204 has input data into the spreadsheet 206 and selected a command to save the spreadsheet.

Figure 4:
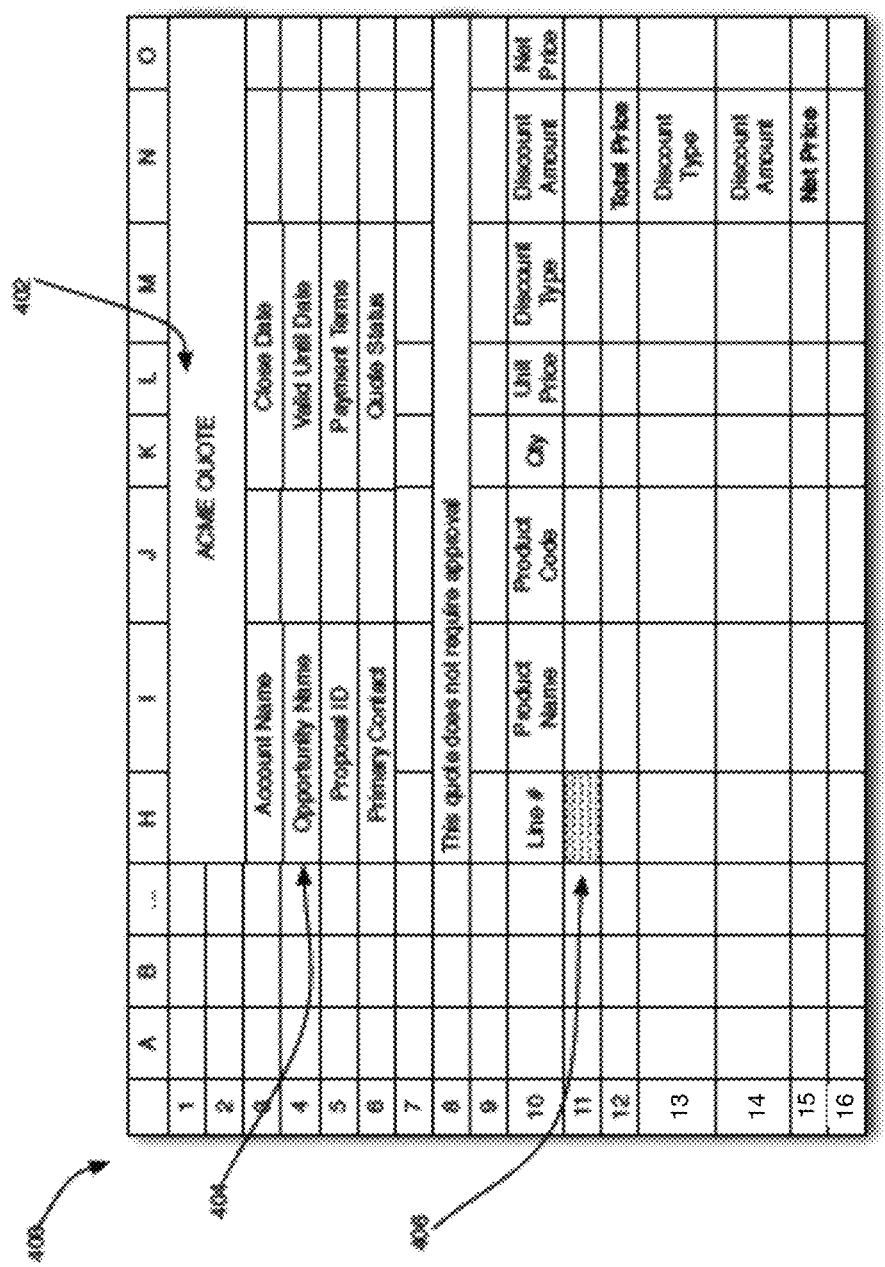
FIG. 4 shows a spreadsheet for creating a quote, in accordance with one embodiment of the invention.

FIG. 4 shows an exemplary spreadsheet 400 generated based on the spreadsheet template 106. The spreadsheet 400 is for generating a quote. As will be seen, the spreadsheet 400 includes areas 402, 404, and 406. The area 402 is for a title. The area 404 displays non-line item information pertaining to the quote, and the area 406 displays line item information. Cells H11 to O11 form a repeating range. Said repeating range displays line item information. Cell H11 is a potential record cell. Moreover, each cell equivalent to the cell H11 in another repeating row within the line item data range (area 406) is also a potential record cell. The condition for a potential record cell to become an actual record cell may be that the quantity in the line item data range is greater than zero.

FIG. 5A shows a table 500 that defines the repeating data range for the spreadsheet 400, in one embodiment. The table 500 specifies that the data area 406 includes cells H11 to O11 corresponding to line items that are repeated below cell H11 based on line numbers.

FIG. 5B shows a table 502 corresponding to a save map 502 for the spreadsheet 400. The table 502 indicates the save record attributes for each row within the data area 406. For example, the table 502 shows that the Line # value of a cell in the data range maps to a field "Line_Number" of a table "Quote Lines" in the remote application 208. All cells in the data range 406 have a row orientation save for the cell OpportunityId which has an independent orientation since it is part of the quote header from the area 404 and is constant for all "Quote Lines".

Figure 6:
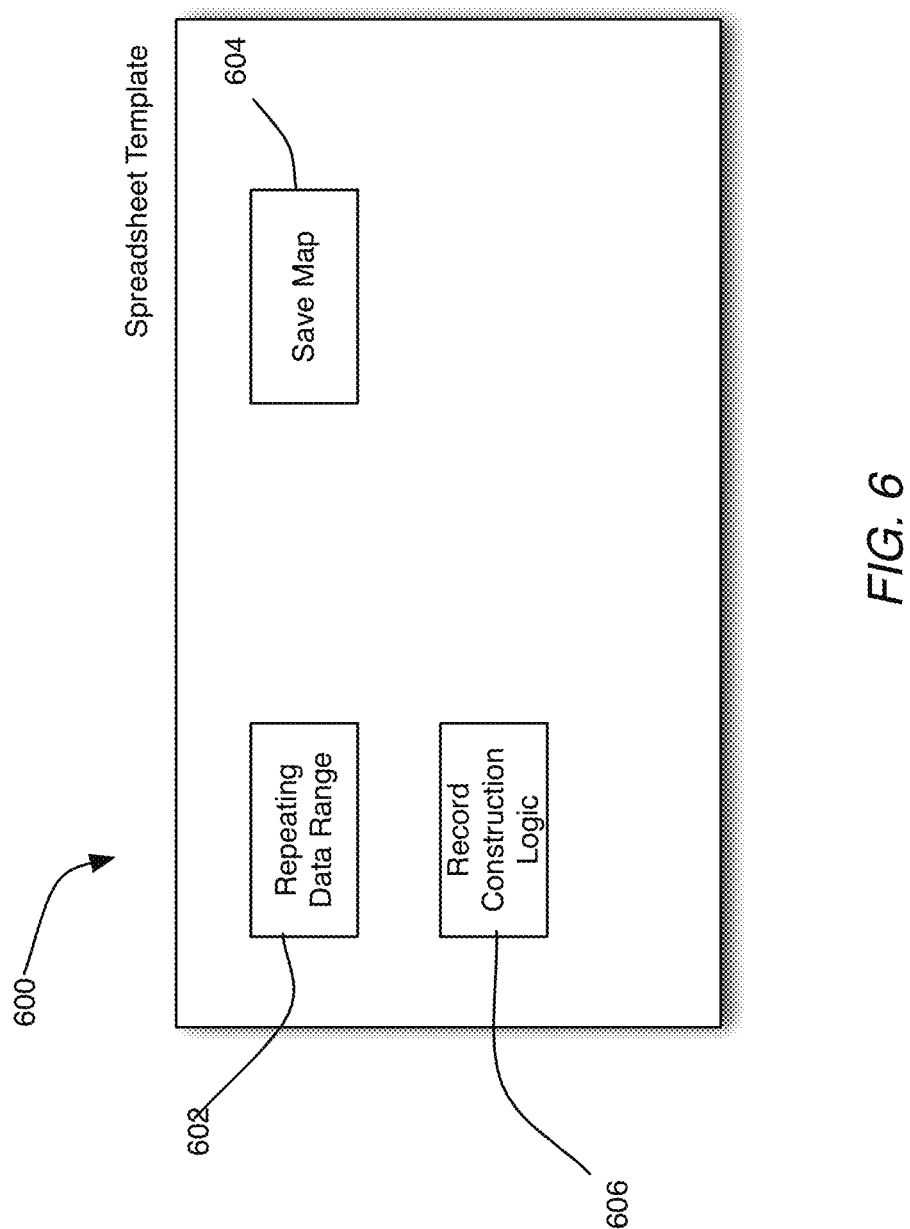

FIG. 6 shows the components of a spreadsheet template 600, in one embodiment. Referring to FIG. 6, the template 600 includes a repeating data range 602 and a save map 604. Record construction logic 606 performs operations to construct records based on potential record cells, as will now be described, with reference to FIG. 7.

Figure 7:
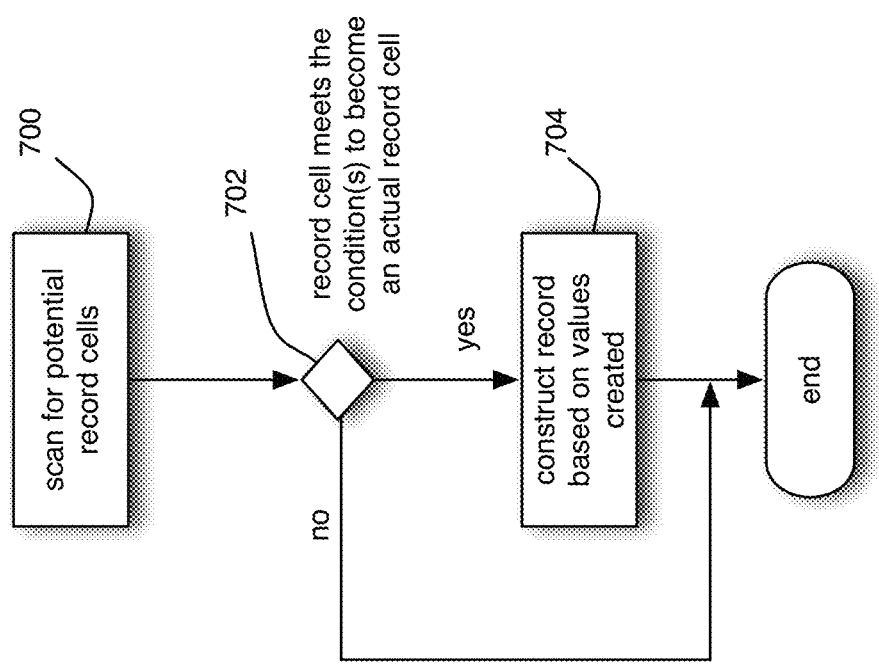
FIG. 7 shows a flowchart of operations to generate an enterprise record, in accordance with one embodiment of the invention.

Turning now to FIG. 7, there is shown a flowchart of operations performed by the Record construction logic 606, in one embodiment. As will be seen, at block 700 a scan is performed for potential record cells. This step may be facilitated by accessing the range repeating data range 602 to identify the potential record cells. At block 702, for each potential record cell a determination is made as to whether the potential record cell meets the condition for it to become an actual record cell. For example, in the case of the spreadsheet 400 this is the case when the quantity is greater than one. At block 704, for each record cell identified as an actual record cell a record is created. This is done based on the save map 604.

By way of a further spreadsheet example, consider the spreadsheet 800 shown in FIG. 8. The spreadsheet 800 was created based on the spreadsheet template 106, and is used to capture budget information from the end user 204. In use, the end user 204 enters values for a fiscal period and an organization unit, when promoted to do so. In the example of FIG. 8, the end user 204 has entered "FY13" for the fiscal period, and "Marketing/UK" for the organization unit. Based on these inputs, the spreadsheet 800 retrieves values for "fiscal periods", and "accounts" associated with a budget for the "Marketing/UK" organization from the remote application 208. Thus, the end user 204 only has to enter values into the area 802. Initially all cells in the area 802 are potential record cells. However, in accordance with the techniques disclosed herein, the cells in the area 802 with values greater than zero are used to generate records for the remote application 208.

To illustrate the creation of the records in the remote application 208, in one embodiment, consider that the remote application 208 includes the tables shown in FIGS. 9A-9C. Referring to these figures, table 900 is a budget header table shown in a pre-data save state. Table 902 is a budget line item table also shown in a pre-data save state. Table 904 shows a budget line item table in a post-data save state. Finally, table 906 shows a budget line item table in a post-data save state.

Table 1000 shown in FIG. 10A shows the repeating data range for the spreadsheet 800, whereas table 1002 shown in FIG. 10B shows the mapping of ranges names to particular cells in the spreadsheet 800. Finally, table 1004 shows a save map for the spreadsheet 800. Using the values input into the cells of the area 802, the save map of table 1004, inserts records to or updates records in the budget header table (see table 904), and the budget line item table (see table 906), in accordance with the techniques disclosed herein.

By way of summary, the template builder 108 may perform the following steps to create a template that can be using to dynamically assemble data into records for the remote application 208:

(a) Using the repeating data range capability, identify which cells comprise a range whose behavior will repeat as like data (same attributes, possibly different values) is retrieved from an outside source or as spreadsheet rows are copied/pasted elsewhere in the spreadsheet. In the example of FIG. 4, H11:O11 would be marked as a repeating range. It is to be noted that this step is optional in some embodiments.

(b) Using the Record Cell Tagging Component:
1. Mark cell H11 as being a Potential Record Cell. This also means that as new repeating rows are created or retrieved based on 1 above, that they would inherit the Potential Cell tag as well (including 2 below)
2. Create a condition that if K11>0, it should become an Actual Record Cell. This step is optional as in some embodiments no condition is associated with a Potential Record Cell. In the latter case all Potential Record Cells are converted into Actual Record Cells.

(c) Using Save Map Component: Define the attributes that would need to be assembled into a record for an actual record cell.

Figure 11:
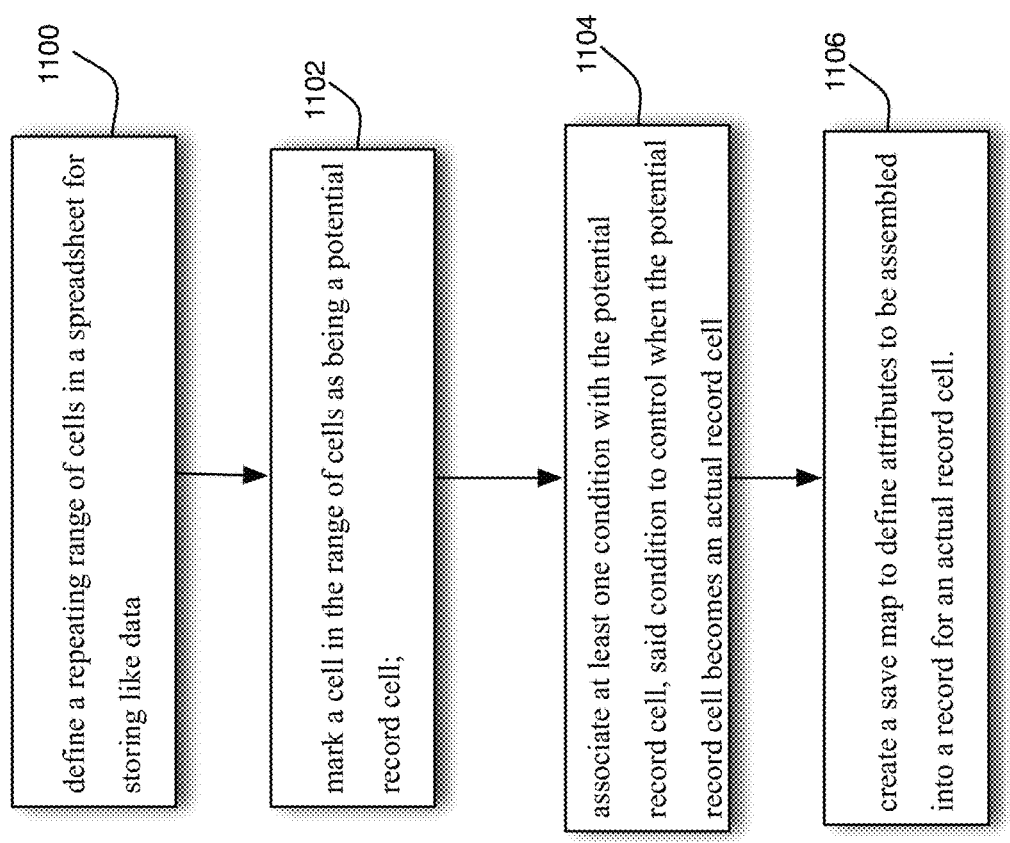
FIG. 11 shows operations performed by the builder application 104 responsive the actions by the template builder 108 to create a spreadsheet template, in accordance with one embodiment of the invention
Figure 12:
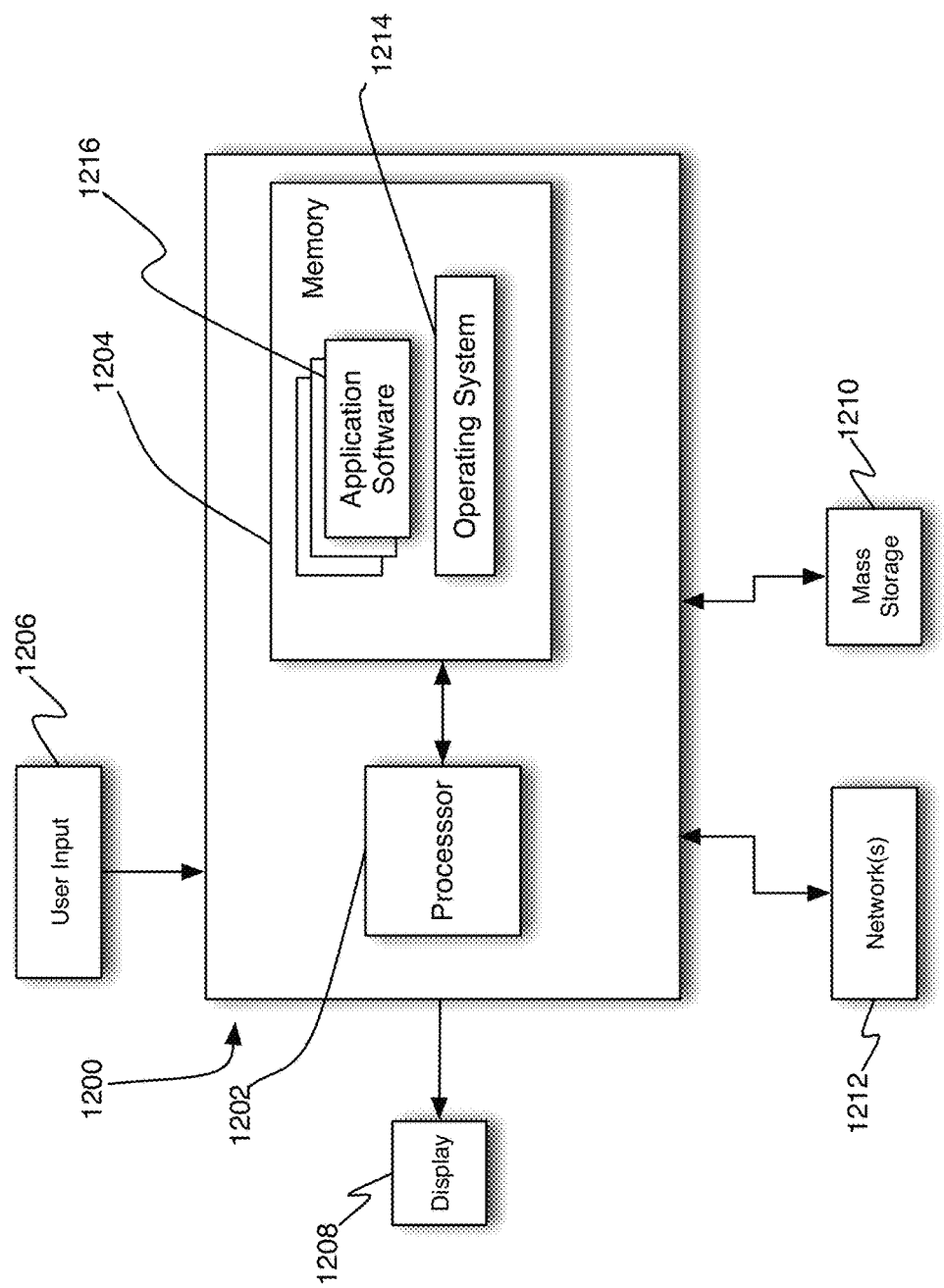
FIG. 12 shows a high-level block diagram hardware for a template builder system and a user device, in accordance with one embodiment of the invention

FIG. 11 shows parallel operations performed by the builder application 104 responsive the actions by the template builder 108 described above. Referring to FIG. 11, the builder application 104 performs the following steps to create a spreadsheet template, in one embodiment:

Step 1100: to define a repeating range of cells in a spreadsheet for storing like data. This step may be optional in some embodiments;

Step 1102: to mark a cell in the range of cells or an independent cell as being a potential record cell;

Step 1104: to associate at least one condition with the potential record cell, said condition to control when the potential record cell becomes an actual record cell. This step is optional in some embodiments; and Step 1106: to create a save map to define attributes to be assembled into a record for an actual record cell FIG. 12 shows exemplary hardware 1200, for the template building system and the user device. The hardware 1200 may includes at least one processor 1202 coupled to a memory 1204. The processor 1202 may represent one or more processors (e.g., microprocessors), and the memory 1204 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1204 may be considered to include memory storage physically located elsewhere in the hardware, e.g. any cache memory in the processor 1202, as well as any storage capacity used as a virtual memory, e.g., as stored on a mass storage device.

The hardware 1200 also typically receives a number of inputs and outputs for communicating information externally. For interface with a user or operator, the hardware may include one or more user input/output devices 1206 (e.g., keyboard, mouse, etc.) and a display 1208. For additional storage, the hardware 1200 may also include one or more mass storage devices 1110, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1212 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1202 and each of the components, as is well known in the art.

The hardware 1200 operates under the control of an operating system 1214, and executes application software 1216 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A computer-implemented method for generating a spreadsheet template, comprising:
    connecting to a remote application which is communicably connected to a database;
    creating at least one record based on user input, wherein the user input corresponds to selecting from a list of predefined records associated with predefined tables included in the remote application;
    defining a repeating range of cells in the spreadsheet template, wherein each cell in the repeating range of cells stores data corresponding to the created record;
    marking at least one cell which is a first cell in the repeating range of cells in the spreadsheet template as being a potential record cell;
    in case there is an association of a condition with the marked at least one cell, then selectively converting said marked at least one cell into an actual record cell; and
    creating a save map to define attributes to be assembled into the record for each potential record cell.

2. The method of claim 1, wherein said selective converting is based on at least one condition associated with each cell marked as a potential record cell, the condition to control when said cell becomes an actual record cell.

3. The method of claim 2, wherein a first cell in the repeating range of cells is marked as a potential record cell.

4. The method of claim 1, wherein defining the repeating range of cells comprises defining a repeat attribute to control a direction in which cells in the repeating range of cells are repeated relative to the first cell in the range.

5. The method of claim 4, further comprising configuring cells in the repeating range of cells to repeat on a row-by-row basis, wherein each new cell that is based on the first cell is itself marked as being a potential record cell.

6. The method of claim 5, wherein each new cell that is based on the first cell as the potential record cell also inherits the at least one condition associated with the first cell.

7. The method of claim 6, wherein the at least one condition comprises a condition that a specified cell in the range of cells has an input data value greater than zero.

8. The method of claim 3, further comprising creating a record construction component comprising logic to identify an actual record cell and to construct a database record based on the save map and an actual record cell.

9. A non-transitory computer-readable medium having stored thereon a sequence of instructions which when executed by a system causes the system to perform a method, comprising:
   connecting to a remote application which is communicably connected to a database;
   creating a record based on user input, wherein the user input corresponds to selecting from a list of predefined records associated with predefined tables included in the remote application;
   defining a repeating range of cells in the spreadsheet template, wherein each cell in the repeating range of cells stores data corresponding to the created record;
   marking at least one cell which is a first cell in the repeating range of cells in the spreadsheet template as being a potential record cell;
   in case there is an association of a condition with the marked as least one cell, then selectively converting said at least one marked cell into an actual record cell based on satisfaction of a condition associated with said cell, the condition to control when said cell becomes and actual record cell; and
   creating a save map to define attributes to be assembled into the record for an actual record cell.

10. The computer-readable medium of claim 9, wherein the method further comprises marking a first cell in the repeating range of cells as a potential record cell.

11. The computer-readable medium of claim 1, wherein defining the repeating range of cells comprises defining a repeat attribute to control a direction in which cells in the repeating range of cells are repeated relative to the first cell in the range.

12. The computer-readable medium of claim 11, wherein the method further comprises configuring cells in the repeating range of cells to repeat on a row-by-row basis, wherein each new cell that is based on the first cell is itself marked as being a potential record cell.

13. The computer-readable medium of claim 12, wherein each new cell that is based on the first cell also inherits the at least one condition associated with the first cell.

14. The computer-readable medium of claim 10, wherein the at least one condition comprises the condition that a specified cell in the range of cells has an input data value greater than zero.

15. The computer-readable medium of claim 14, wherein the method further comprises creating a record construction component comprising logic to identify an actual record cell and to construct a database record based on the save map and an actual record cell.

16. A system, comprising:
   a processor; and
   a memory coupled to the processor, the memory storing instructions which when executed by the system causes the system to perform a method for creating a spreadsheet template to facilitate creation of a spreadsheet, comprising:
   connecting to a remote application which is communicably connected to a database;
   creating a record based on user input, wherein the user input corresponds to selecting from a list of predefined records associated with predefined tables included in the remote application;
   defining a repeating range of cells in the spreadsheet template, wherein each cell in the repeating range of cells stores data corresponding to the created record;
   marking at least one cell which is a first cell in the repeating range of cells in the spreadsheet as being a potential record cell;
   in case there is an association of a condition with the marked at least one cell, then selectively converting said marked at least one cell into an actual record cell based on satisfaction of a condition associated with said cell, the condition to control when said cell becomes and actual record cell; and
   creating a save map to define attributes to be assembled into the record for an actual record cell.

17. The system of claim 16, wherein the method further comprises marking a first cell in the repeating range of cells as a potential record cell.

18. The system of claim 16, wherein defining the repeating range of cells comprises defining a repeat attribute to control a direction in which cells in the repeating range of cells are repeated relative to the first cell in the range.

19. The system of claim 18, wherein the method further comprises configuring cells in the repeating range of cells to repeat on a row-by-row basis, wherein each new cell that is based on the first cell is itself marked as being a potential record cell.

\* \* \* \* \*